Figure 1:
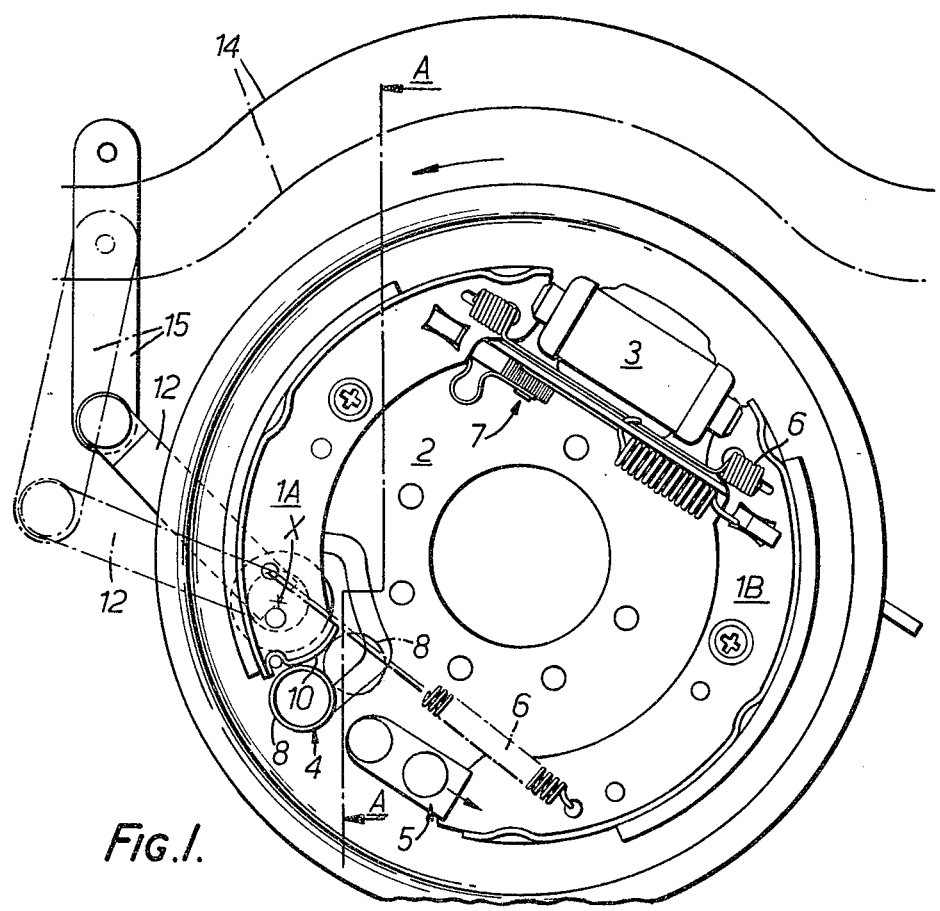

United States Patent [19]
Wilson et al.

[11] 4,250,981
[45] Feb. 17, 1981

[54] LOAD RESPONSIVE DRUM BRAKE ASSEMBLY

[75] Inventors: Alexander J. Wilson, Sutton Coldfield; Hugh G. Margetts, Leamington Spa; Geoffrey Harvey, Birmingham, all of England

[73] Assignee: Lucas Industries Limited, Birmingham, England

[21] Appl. No.: 56,229

[22] Filed: Jul. 10, 1979

[30] Foreign Application Priority Data

Jul. 10, 1978 [GB] United Kingdom ............... 29345/78

[51] Int. Cl.³ ................... F16D 51/24; F16D 65/09
[52] U.S. Cl. ................... 188/327; 188/195; 188/341; 192/75
[58] Field of Search ............... 188/331, 325, 327, 341, 188/195, 333, 78, 328, 334; 192/75

[56] References Cited

U.S. PATENT DOCUMENTS

| | | | |
|---|---|---|---|
| 1,385,482 | 7/1921 | Carter | 188/326 X |
| 2,081,521 | 5/1937 | White | 188/331 |
| 3,386,538 | 6/1968 | Cairns et al. | 188/195 |

FOREIGN PATENT DOCUMENTS

| | | | |
|---|---|---|---|
| 575780 | 4/1924 | France | 188/325 |
| 1458032 | 9/1966 | France | 188/325 |
| 632934 | 12/1949 | United Kingdom | 188/327 |

*Primary Examiner*—George E. A. Halvosa
*Attorney, Agent, or Firm*—Scrivener, Clarke, Scrivener and Johnson

[57] ABSTRACT

A vehicle drum brake has a shoe mounted on a back plate, one end of the shoe engaging an actuator and the other end engaging an abutment. To avoid the use of a fluid pressure control valve to vary the braking effort of the brake in dependence upon vehicle loading, the abutment is in the form of a roller which engages an arcuate member on the shoe, the roller being movable laterally of the shoe to vary the braking effort for a given actuating force. The roller may be connected to a pivoted lever which is rotatably mounted in the back plate and which is connected to a sprung part of the vehicle by a linkage. Movement of the sprung part due to changes in vehicle loading rotates the lever and moves the roller.

15 Claims, 7 Drawing Figures

LOAD RESPONSIVE DRUM BRAKE ASSEMBLY

This invention relates generally to vehicle braking systems and more particularly to drum brake assemblies for such systems.

It is known in vehicle braking systems to vary the braking effort of the rear wheel brakes, as compared to the front wheel brakes, in dependence upon vehicle loading. In this way a greater rear braking effort is applied for a laden vehicle than for an unladen vehicle, thereby reducing the risk of rear wheel lock.

Commonly, the variation in rear wheel braking effort is achieved by a control valve in the pressure line from the master cylinder to the rear wheel brakes, the valve being operative to cut-off the pressure supply to the rear wheel brakes, or reduce the pressure supplied to the rear wheel brakes as compared to the front wheel brake pressure, when a predetermined "cut-in" pressure is attained. The "cut-in" pressure is dependent upon the loading of the vehicle.

The aim of the present invention is to obviate the need for such a control valve to vary the rear/front wheel braking ratio in a braking system using rear wheel drum brakes.

In accordance with the present invention, there is provided a drum brake assembly comprising a brake shoe, actuating means acting on one end of the brake shoe for urging the brake shoe towards a braking surface, an abutment engaged by the other end of the brake shoes, the abutment being movable laterally of the shoe to vary the braking effort applied to the braking surface for a given actuating force applied by the actuating means.

The abutment is preferably attached to a lever mounted for pivotal movement about an axis parallel with the drum axis.

The lever may be connected to a sprung part of a vehicle when the brake assembly is on the vehicle or alternatively the lever may be connected to the vehicle suspension. In either case movement of the sprung part of the vehicle due to loading or unloading effects rotation of the lever and movement of the abutment to vary the braking effort of the assembly.

The invention also provides a vehicle having a drum brake assembly including mechanical means for altering the braking effort of the brake assembly in dependence upon loading of the vehicle.

Figure 2:
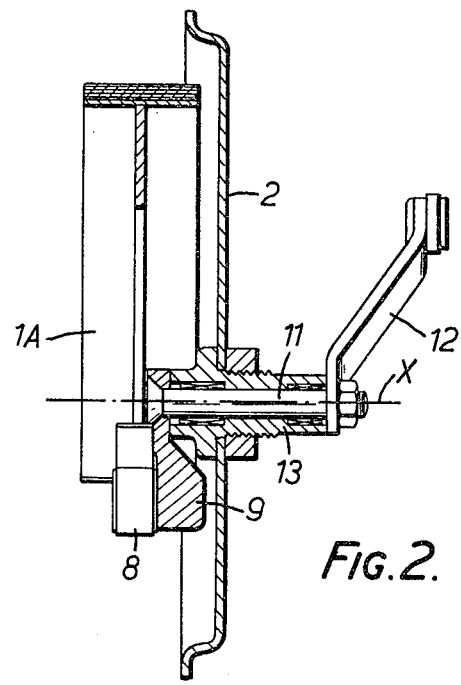
Figure 3:
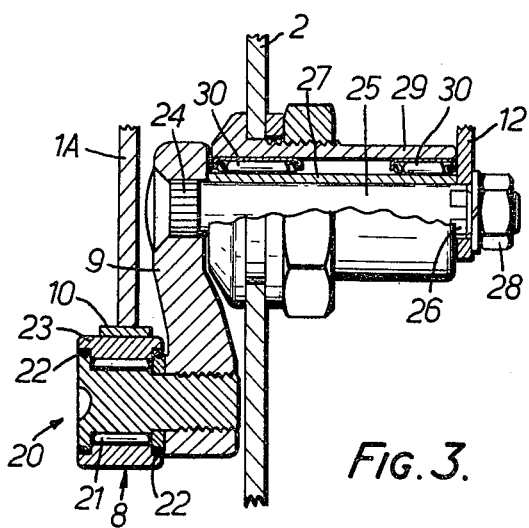
Figure 4:
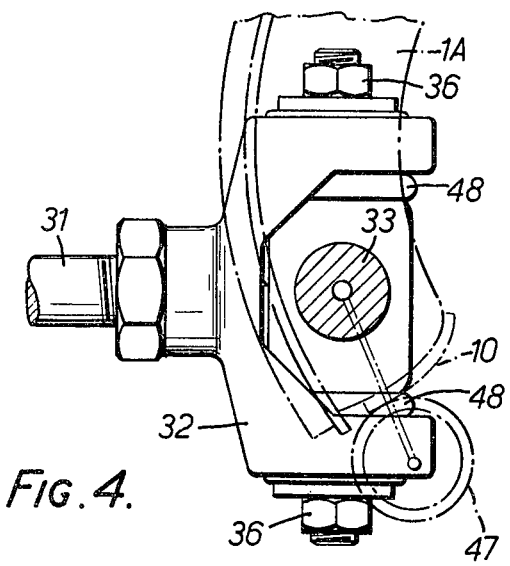
Figure 5:
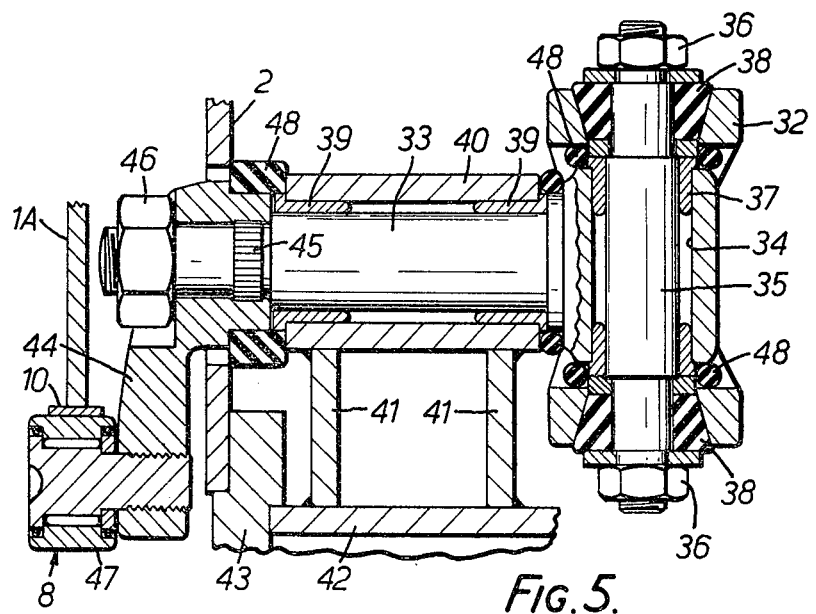
Figure 6:
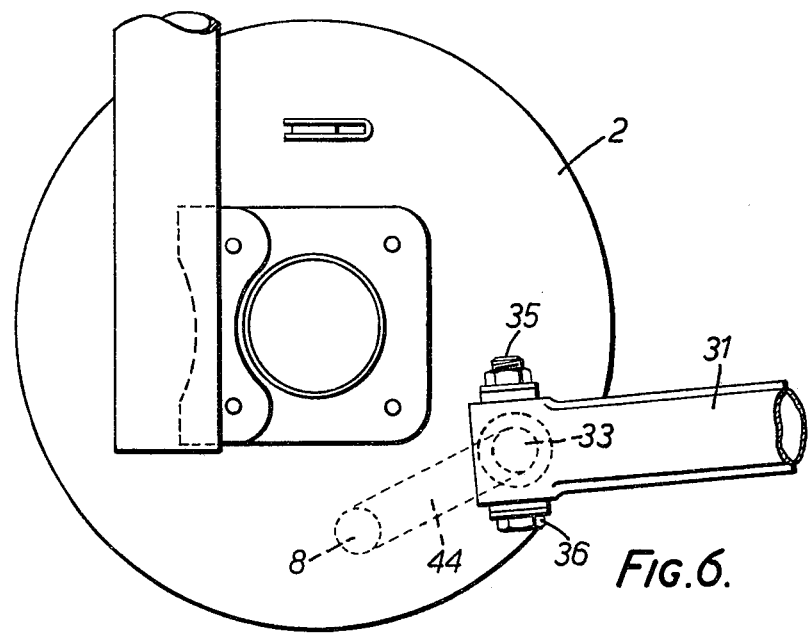
Figure 7:
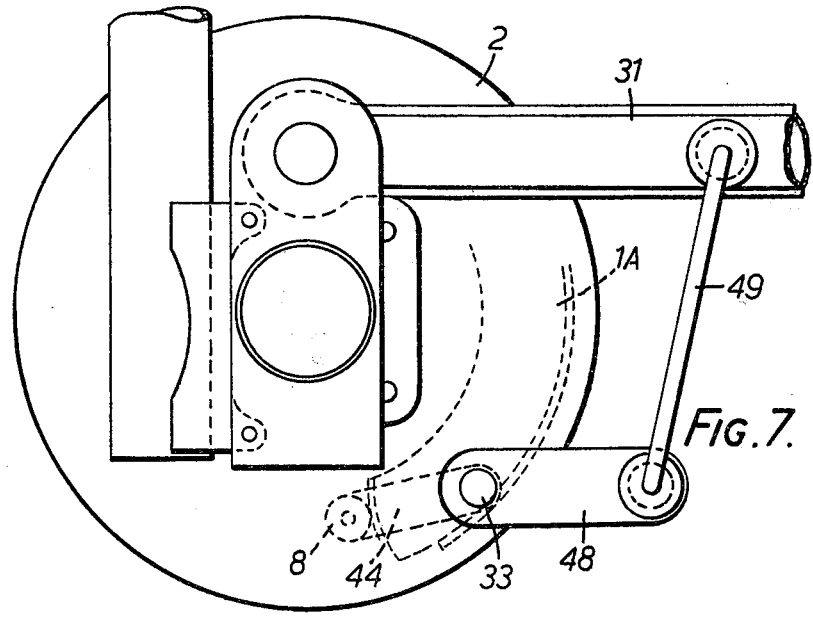

Some forms of internal shoe drum vehicle brake assembly in accordance with the invention having load-sensing arrangements for altering the position of a shoe abutment in dependence upon loading of the vehicle will now be described by way of example, with reference to the accompanying drawing, in which:

FIG. 1 is a plan view of one form of brake, assembly,

FIG. 2 is a scrap sectional view taken along the line A—A of FIG. 1 illustrating one load-sensing arrangement, FIG. 3 is a scrap sectional view similar to FIG. 2 illustrating another load-sensing arrangement, FIG. 4 is a detail view illustrating yet another load-sensing arrangement, FIG. 5 is a composite sectional view of the arrangement of FIG. 4, FIG. 6 is a rear view of a modified form of brake assembly, and FIG. 7 is a rear view similar to FIG. 6 of another modified form of assembly.

The brake assembly of FIG. 1 is for a rear wheel of a vehicle and is of the leading/trailing shoe type and comprises two arcuate brake shoes 1A, 1B mounted on a stationary back plate 2. One pair of adjacent ends of the brake shoes 1A, 1B engage a double-ended actuating cylinder 3 and the other pair of adjacent ends engage abutments 4, 5. The brake shoes are biased towards each other to their illustrated, inoperative positions by return springs 6. An adjusting device 7 is provided to compensate for wear of the shoe friction linings.

The abutment 5 of the trailing shoe 1B is fixed to the back plate 2, but the abutment 4 of the leading shoe 1A is movable and takes the form of a roller 8 which engages a curved, preferably arcuate, member 10 secured to the web of the brake shoe 1A.

Movement of the roller 8 is controlled in dependence upon vehicle loading by a mechanical load-sensing arrangement.

In the arrangement of FIGS. 1 and 2, the roller 8 is mounted on the end of an arm 9 which is secured, through the intermediary of a pivot pin 11, to a link 12, the pin 11 being mounted for rotation about the axis X, which is parallel with the drum axis, in bearings in a sleeve 13 that is fixed to the back plate 2.

Pivotally attached to the upper end of lever 12 and to the sprung part 14 of the vehicle, i.e. that part supported by the vehicle suspension is a link 15.

When the vehicle is in its unladen condition, i.e. with a driver only, the sprung part of the vehicle is in its upper position and the link 15, link 12 and abutment 4 adopt the positions illustrated in full lines in FIG. 1. As the load on the sprung part 14 is increased the link 15 moves downwardly and the link 12 and arm 9 rotate about the axis X of pin 11 and there roller 8 travels laterally of the shoe and substantially radially of the brake. In the fully laden condition of the vehicle the components adopt the positions shown in broken lines. The effect of the movement of roller 8 is to increase the braking torque for a given input pressure of the cylinder 3. In other words the shoe factor, i.e. the output/input ratio, of the shoe 1A, and thus the total brake factor, is increased as the loading of the vehicle increases.

The loading-sensing arrangement of FIG. 3 is a modified form of that of FIG. 2 and the same reference numerals are used to denote corresponding parts. In FIG. 3 the roller 8 is in the form of a stud-type cam follower 20 which has a stud that is screwed into a tapped hole in the arm 9. The cam follower 20 has roller bearings 21, which provide low friction, and seals 22. The bearings 21 are surrounded by a rotatable annular part 23 of large section which ensures that localised loads on the cam follower 20 are evenly distributed over the bearing needles.

The upper end of arm 9 has a hole which receives as a force fit a knurled end 24 of a spindle 25, the arm 9 and spindle 25 thereby being rotationally locked together and forming a lever. At its other end the spindle has flats or splines 26 which fit in a hole in lever 12 to non-rotatably attach the spindle 25 to the lever 12. A spacer sleeve 27 surrounds the spindle 25 and is clamped to the lever 12 by a nut 28. The sleeve 27 is rotatably supported on the back plate 2 by a casing 29 and runs in needle bearings 30, which are preferably sealed.

Operation of the arrangement of FIG. 3 is the same as that of FIG. 2. Briefly, rotation of lever 12 caused by a change in vehicle loading is transmitted through the spindle 25 and arm 9 to move the cam follower 20 along the member 10 and thus vary the shoe factor of the shoe 1A.

In operation of the brake under full braking conditions, a large force pushes downwardly (as seen in FIG. 2) on the member 10 and that force is transmitted to the bearings 30. Thus, the cam follower 20, arm 9 and spindle 25 have to be sufficiently robust to transmit the large operating force. However, since the rotation of the cam follower 20 and the spindle 25 in their respective bearings 21,30 has low friction, the torque on the arm 9 is minimal and simple and cheap means for torque transmission, such as the knurl of spindle 26, can be used.

In each of the above-described arrangements, the line of action of the force through the roller 8 passes through the arm 9 and through the axis of the pin 11 or spindle 25 to all positions of the arm 9. The lever 12 which is connected to the sprung part of the vehicle takes none of the force and there is substantially no torque on the arm 9.

The load-sensing arrangement of FIGS. 4 and 5 is connected to the vehicle suspension. The vehicle suspension has a trailing link 31 (FIG. 4) on the end of which is mounted a yoke 32. One end of a spindle 33 has a bore 34 and is mounted in the yoke 32 by a bolt 35 secured by nuts 36, the axis of the bolt 35 being perpendicular to the axis of spindle 33. The bolt 35 is rotatably mounted in the bore 34 in bearings 37 and is located in the yoke 32 by bushes 38 of rubber or other resilient material which serve to isolate the road vibrations from the spindle 33.

The shaft of spindle 33 is mounted in bearings 39 located in a tube 40, the tube 40 being secured by plates 41 to a part of an axle beam 42 of the vehicle. The plates 41 are preferably welded to the tube 40 and the beam 42. At the end of the beam 42 is a flange 43 which locates the back plate 2. If the road wheel (not shown) is not driven, the axle beam 42 has rigidly attached thereto a stub axle for the wheel.

In order to protect moving parts of the arrangement annular elements 48 of spongy rubber are provided between the parts.

The spindle 33 is non-rotatably attached to an arm 44, similar to arm 9 of FIGS. 2 and 3 by a splined or kurnled part 45 fitting in a hole in the arm 44 and is located axially by a nut 46. At its lower end the arm 44 carries the roller 8 in the form of a stud-type cam follower 47, similar to the follower 20 of FIG. 3, which engages the curved member 10 on the end of shoe 1A.

In operation, all fore and aft suspension forces are fed from the link 31 to the beam 42 through yoke 32, spindle 33, tube 40, bearings 39 and plates 41. When there are changes in vehicle loading, the link 31 moves either up or down to cause the spindle 33 and arm 44 to rotate, thus moving the follower 47 to move along the member 10 to vary the brake factor.

It should be noted that in this arrangement the backplate is isolated from the abutment forces, which removes a design restriction. Furthermore, the spindle 33 carries out two functions, namely the attachment of the link 31 to the unsprung part of the vehicle, i.e. to the beam 42, and the transmission of rotation to the arm 44 to change the brake factor.

It will be seen that the link 31 is substantially rigidly connected to the arm 44, except for the use of the rubber bushes 38, in the plane which is perpendicular to the wheel axis. Longitudinal bending forces in the link thus provide the torque required to rotate the lever arm, although, as described above, the torque may be substantially zero.

FIG. 6 illustrates an assembly having a load sensing arrangement similar to that of FIGS. 4 and 5 and the same reference numerals have been used to denote corresponding parts. The main difference of the arrangement of FIG. 6 is that the spindle 33 connected to the arm 44 is mounted in the back plate 2, in a manner similar to that shown in FIG. 2, instead of on the axle beam 42, as shown in FIG. 5.

In FIG. 7, which is similar to FIG. 6, the spindle 33 is indirectly connected to the suspension link 31 through a pivoted linkage comprising a link 48 connected to the spindle 33 and a connecting rod 49 pivotally connecting the link 48 to the pivoted suspension link 31.

It will be appreciated that in such an indirect connection the linkage 48,49 between the spindle 33 and the suspension link 31 is a simple tension linkage and is not subjected to side forces.

In the arrangements of FIGS. 3 and 4 and 5, the cam followers, arms and spindles effectively form a three-piece lever in which the arm can be a soft forging and the follower and spindle can be case hardened to accommodate roller or plain bearings.

It will be appreciated that in all of the above-described arrangements the curved member 10 may be separate from, but secured to, the shoe 1A and of a different material from the shoe. Thus, the member may be of hard wearing material to protect the end of the shoe, which may be of a soft steel to perform its other functions.

In leading/trailing brake assemblies the leading shoe generally tends to wear more quickly than the trailing shoe. However, in the above-described assemblies the reduction of the brake factor when the vehicle is unladen reduces the effect of the leading shoe and thus reduces the differential wear of the shoes. It can be arranged that in the unladen condition the shoe actions are about the same and the wear on the leading and trailing shoes is about equal. Only when the vehicle is fully laden does substantial differential wear occur.

It will be appreciated that each of the above-described arrangements compensates for changes in the physical loading of the vehicle to effect a change in the front/rear wheel braking ratio. It also compensates for weight transfer from the rear to the front of the vehicle due to braking, asymmetric loading with respect to the longitudinal axis of the vehicle, and weight transfer from one side to the other of the vehicle due to cornering.

The above-described assembly has the advantages that it obviates the use of apportioning valves in the hydraulic braking circuit and simplifies the hydraulic piping of the circuit. Furthermore, it alters the braking torque in dependence upon lateral, as well as longitudinal, weight changes and acts continuously.

Although a leading/trailing shoe brake assembly has been described, the invention is applicable to other forms of drum brake assembly.

We claim:

1. A load responsive drum brake assembly comprising a vehicle having a sprung part and an unsprung part, a rotatable brake drum having a braking surface mounted on said unsprung part, at least one brake shoe, mounted within the drum and movable towards and away from said brake surface, actuating means acting on one end of the brake shoe for urging the brake shoe towards said braking surface, an abutment engaged by the other end of the brake shoe, the abutment being constructed and arranged movable to vary the point of engagement of the shoe therewith and thereby the braking effort applied to the braking surface for a given actuating force applied by the actuating means, and a linkage connecting said abutment to said sprung vehicle part, relative movement of the said sprung and unsprung parts effecting movement of said linkage to move said abutment.

2. An assembly according to claim 1, wherein said linkage comprises a lever which is attached to said abutment and is mounted for pivotal movement about an axis parallel with the drum axis.

3. An assembly according to claim 2, including a stationary back plate on which said shoe is mounted, wherein said lever extends through said back plate.

4. An assembly according to claim 2, wherein said lever has an elongate part which is rotatable about its axis and a depending part which carries said abutment.

5. An assembly according to claim 4, including a casing in which said elongate part is rotatably mounted.

6. An assembly according to claim 5, wherein bearings are interposed between the elongate part and the casing.

7. An assembly according to claim 5, wherein the casing is fixed to an unsprung part of the vehicle.

8. An assembly according to claim 7, wherein the vehicle has an axle beam to which the casing is fixed.

9. An assembly according to claim 2 wherein the lever is connected to a vehicle suspension link, movement of the link due to changes in vehicle load effecting rotation of the lever.

10. An assembly according to claim 9, wherein the link has a connection with the lever such that the link can pivot relative to the lever about an axis perpendicular to the drum axis and transmits to the lever pivotal movement about an axis parallel with the drum axis.

11. An assembly according to claim 10, wherein the link is connected to a yoke having a pin which extends through a hole in the lever, the pin extending perpendicular to the axis of rotation of the lever.

12. An assembly according to claim 2, wherein the abutment is a roller having a stud by which a follower is connected to the lever.

13. An assembly according to claim 12, wherein said roller has a fixed central part and a rotatable outer part and bearings between the parts.

14. An assembly according to claim 1, including a curved member secured to one end of the brake shoe, said abutment engaging said curved member.

15. An assembly according to claim 1, wherein the abutment has a bearing which is engageable with the shoe.

* * * * *